(12) United States Patent
Wigglesworth et al.

(10) Patent No.: US 8,948,045 B2
(45) Date of Patent: Feb. 3, 2015

(54) COMMUNICATION SYSTEM AND METHOD OF CONFIGURING A COMMUNICATION INTERFACE

(75) Inventors: Craig Douglas Wigglesworth, Kanata (CA); David Watkinson, Kanata (CA); John Fischer, Stittsville (CA)

(73) Assignee: Alcatel Lucent, Boulogne-Billancourt (FR)

( * ) Notice: Subject to any disclaimer, the term of this patent is extended or adjusted under 35 U.S.C. 154(b) by 566 days.

(21) Appl. No.: 11/449,073

(22) Filed: Jun. 8, 2006

(65) Prior Publication Data
US 2007/0286094 A1    Dec. 13, 2007

(51) Int. Cl.
*H04L 12/28*    (2006.01)
*H04L 12/24*    (2006.01)

(52) U.S. Cl.
CPC ................................ *H04L 41/0803* (2013.01)
USPC ............ 370/254; 370/400; 370/463; 707/795

(58) Field of Classification Search
USPC .......................................................... 710/62
See application file for complete search history.

(56) References Cited

U.S. PATENT DOCUMENTS

| | | | |
|---|---|---|---|
| 2003/0035414 A1* | 2/2003 | Beyda ............................ | 370/352 |
| 2004/0029585 A1* | 2/2004 | Akgun et al. ............... | 455/432.2 |
| 2006/0089988 A1* | 4/2006 | Davie et al. .................... | 709/225 |
| 2006/0126607 A1* | 6/2006 | Andrews ........................ | 370/359 |
| 2007/0022106 A1* | 1/2007 | Brandt et al. ...................... | 707/4 |
| 2007/0245034 A1* | 10/2007 | Retana et al. ................. | 709/238 |

OTHER PUBLICATIONS

Cisco Systems, Cisco Networking Academy Program, 2003, Cisco Systems, Inc., pp. 1-6.*
Narten, T. et al., Neighbor Discovery for IP Version 6 (IPv6), Network Working Group, 102 pp., Dec. 1998.
Thomson, S. et al., "IPv6 Stateless Address Autoconfiguration", Network Working Group, 28 pp., Dec. 1998.
Narten, T. et al., Neighbor Discovery for IP version 6 (IPv6), draft-ietf-ipv6-2461bis-06.txt, 105 pp., Mar. 2006.

* cited by examiner

*Primary Examiner* — Nicholas Sloms
(74) *Attorney, Agent, or Firm* — Eckert Seamans Cherin & Mellot, LLC

(57) ABSTRACT

A network element has one or more logical communication interfaces each of which has a data set defining parameters for the interface. A data storage medium stores a profile containing information for an interface, the profile having a profile identifier for identifying the profile. The data set associated with an interface includes a profile identifier for enabling the communication interface to access information in the profile by referring to the profile identifier. The profile may include information relating to neighbor discovery communications between one network element and another, and the same profile may be accessed by any number of interfaces.

13 Claims, 5 Drawing Sheets

```
Alcatel[RO]> configure
Alcatel[RO]> ipv6 system interface-profile 1
Per Interface Profile Identifier: NDIP-1
--------------------
   Send Router Advertisements:              TRUE
   Minimum Router Advertisement Interval:   200 sec
   Maximum Router Advertisement Interval:   600 sec
   Advertised Managed Flag:                 FALSE
   Advertised Other Configuration Flag:     FALSE
   Advertised Reachable Time:               0 (unspecified)
   Advertised Retransmit Time:              0 (unspecified)
   Advertised Hop Limit:                    64
   Advertised Default Lifetime:             1800 sec
   Advertised Maximum DAD Attempts:         1
[c:] RUNNING_V6READY:1-8 Maj:Alrm:15 10MAR2006 10:24
Alcatel[RO]>
```

FIG. 3

```
Alcatel[RO]> ipv6 system prefix-profile 1
Per Prefix Profile Identifier: NDPP-1
--------------------
   On Link Flag:                     TRUE
   Autonomous Flag:                  TRUE
   Valid Lifetime:                   2592000 sec (~30 days)
   Preferred Lifetime:               604800 sec (~7 days)
   Valid Lifetime Decrement Flag:    FALSE
   Preferred Lifetime Decrement Flag: TRUE
   Advertisement of Prefix Flag:     TRUE
[c:] RUNNING_V6READY:1-8 Maj:Alrm:15 10MAR2006 10:25
Alcatel[RO]>
```

FIG. 4

```
Alcatel[RO] > show interfaces detail 1-4-1-2
Interface Representation   Local IP Address        [Neighbor IP Address]    Op. Status
------------------------------------------------------------------------------------------
1-4-1-2                    3FFE:501:FFFF:1::/64 eui-64                      Up
                           2001:100:ABCD:1::/64 eui-64

Link Local Address:     FE80::280:21FF:FE2D:10EF
Global Addresses:       3FFE:501:FFFF:1:280:21FF:FE2D:10EF
                        2001:100:ABCD:1:280:21FF:FE2D:10EF
                        ND Prefix Profile: NDPP-1 (Life: ~30 days Pref: ~7 days)
                        ND Prefix Profile: NDPP-2 (Life: ~2 days Pref: ~1 days)
Multicast Addresses:    FF02::1
                        FF02::2
                        FF02::1:FF2D:10EF IfIndex:                268697602 (0x10040002)
Alarms:                 Enabled               Admin Status:         Enabled
ND Interface Profile:   NDIP-1                ICMPv6 Unreachables:  Enabled
MTU:                    1500 bytes            Encapsulation:        Ethernet
IP Traffic Field:       None : Def Cos 8      Bandwidth:            1000000kb/s (Shared)
Ingress DSCP Marking:   No                    Egress DSCP Marking:  No
Allow Extension Hdrs:   Enabled
COS Classification:     DS: 1
MAC Address:            N/A
```

COMMUNICATION SYSTEM AND METHOD OF CONFIGURING A COMMUNICATION INTERFACE

FIELD OF THE INVENTION

The present invention relates to communication systems, and in particular, to communication interfaces on network elements and methods for configuring communication interfaces.

BACKGROUND

A network element such as a router, typically comprises one or more line cards each having a number of physical communication ports for connection to network links for carrying communication traffic, and a control card for controlling and managing operation of the line card(s). A number of logical interfaces can be implemented at each physical port for logical connection to other network nodes such as hosts or routers. Each logical interface is defined by a series of parameters which identify the interface and determine its operation in handling traffic. For example, an IPv6 (Internet Protocol Version 6) logical interface typically includes a link local address and one or more global addresses and may also include one or more multi-cast addresses. Other definitions include the transport protocol of the interface, for example, ATM (asynchronous transfer mode), Ethernet, POS (Packet-over-SONET), the bandwidth of the interface and the maximum transmission unit (MTU), i.e. the maximum packet size in octets that can be conveyed in one piece over a link.

In addition to these parameters, each interface is adapted to exchange specific communications with neighboring network nodes for neighbor discovery, in order to identify itself to its neighbors, provide other information to its neighbors to enable its neighbors to configure themselves for communication with the interface, and so that the interface can maintain and update records of its neighboring nodes. Variables and their settings which govern neighbor discovery of an interface are also included in the interface definition.

In Internet Protocol Version 6 (IPv6), communications used in neighbor discovery include router advertisements, router solicitations, neighbor solicitations and neighbor advertisements. A router advertisement is used by routers to advertise their presence, together with various link and internet parameters either periodically, or in response to a router solicitation message. Parameters controlling the frequency at which unsolicited router advertisements are sent, as well as their format are all specified in the interface definition. Parameters governing the frequency of router advertisements typically include minimum and maximum router advertisement intervals. Information contained in router advertisements, which is typically specified as settings of various variables or parameters, include a "managed address configuration flag" which is used by a host for address configuration, "other configuration flag" which is used by a host to configure other (i.e. non-address) information, variables which are used for neighbor unreachability detection, a variable indicating hop limit, and other parameters. Router advertisement messages may also contain internet parameters such as the hop limit that hosts should use in outgoing packets, and optionally, link parameters such as the link MTU. Router advertisements also contain a list of prefixes used by nodes for on-link determination and/or autonomous address configuration, together with flags associated with the prefixes which specify the intended uses of a particular prefix. The advertised on-link prefixes are used by hosts to create and maintain a list for use in deciding when a packet's destination is on-link or beyond a router. Variables and flags which may be associated with each prefix include an on-link flag, an autonomous flag, valid and preferred lifetime values, valid and preferred lifetime decrement flags and an advertisement of prefix flag.

Referring to FIG. 1, which shows a schematic diagram of an example of a network element 101, a definiton of each logical interface 1, 2, 3, 4, 5 . . . etc., is stored in the memory 103, 105 of the associated line card 107, 109 which implements the interface. A copy of each interface definition is also stored in a non-volatile memory 111 of the control card 113, so that a permanent record of the interface definitions are available locally for transferring to a respective line card, if the line card interface definitions are lost, for example, through removal of electrical power to the line card, or for downloading into and initiating a new line card. As shown in FIG. 1, each interface definition includes both a list of settings for neighbor discovery interface parameters and neighbor discovery prefix parameters, which, for example, are used in generating router advertisements.

IPv6 interfaces on routers may be configured using default settings for each neighbor discovery configuration item or parameter. If an operator wishes to use different settings for a particular deployment, the operator is required to modify the settings away from the default values manually for each customer interface. As noted above, each neighbor discovery interface definition includes a large number of parameters whose settings can be specified by an operator. In addition, many thousands, e.g. tens or hundreds of thousands of interfaces may be provisioned on a single router and large amounts of storage space are required to store the IPv6 neighbor discovery interface and prefix parameters against each interface. Furthermore, any changes to neighbor discovery configuration items may need to be made for large numbers of interfaces which is both laborious and time consuming.

SUMMARY OF THE INVENTION

According to one aspect of the present invention, there is provided a communication system comprising a network element having a communication interface, said system including a data storage medium storing a profile containing a type of information for said interface, said profile having a profile identifier for identifying said profile, and wherein said communication interface is operable to access information in said profile by referring to said profile identifier.

In this arrangement, information for an interface is stored in a profile and the interface includes a reference to the profile to enable the interface to access information stored therein. This allows information that is explicitly included in an interface, and which may comprise settings for numerous parameters, to be replaced by a reference or pointer to a profile containing the information, thereby considerably simplifying the process used to initially configure or change the configuration of an interface. For example, when one or more settings for an interface needs to be changed, the only modification that need be made to the interface is a change from the present profile identifier to the identifier of another profile containing the required setting(s).

In addition, the profile provides a means of considerably reducing the storage space required to store settings for large numbers of interfaces by allowing interfaces shared access to the profile by referring to the profile identifiers, and thereby removing the need to store the parameters in each interface. This also considerably reduces the time required to modify parameters for large numbers of interfaces, since all of the interfaces can be modified simply by modifying the common profile to which they all refer.

In any embodiments, one or more communication interface(s) comprises a logical interface comprising data defining the interface, the data including one or more profile identifiers.

In embodiments, the system may include one profile or a plurality of profiles. In either case, the profile identifier may enable the profile to be distinguished from one or more other profiles containing the same type of information.

Thus, in some embodiments, the data storage medium stores a plurality of profiles each containing the same type of information, each profile having an identifier for enabling each profile to be identified and distinguished from another of the plurality of profiles, and wherein the communication interface is configurable to access information contained in any of the profiles by referring to an identifier identifying a selected profile.

In some embodiments, the information in each profile includes a setting for a parameter, and one or more profiles includes a first setting for a parameter, and one or more other profiles includes a different setting for the same parameter.

In some embodiments, one or more profiles each includes a plurality of settings, each setting being for a different parameter.

In some embodiments, one of the profiles includes a respective setting for each of a group of parameters and another profile includes a respective different setting for one or more parameters in the group.

In some embodiments, the information contained in one or more profiles includes configuration information for transmission to and for configuring another network element. For example, the configuration information may be used to configure or control the behaviour of the network element, such as how it communicates with the interface or another network element. In some embodiments, the configuration information is for use by the network element to which the information is transmitted in controlling neighbor discovery communications.

In some embodiments, one or more profiles contain a setting for each of one or more parameters for use by the interface in implementing neighbor discovery, for example, IPv6 neighbor discovery. Non-limiting examples of such parameters include settings for controlling operation of the interface in neighbor discovery and settings for parameters to be included in messages transmitted from the interface for neighbor discovery.

In some embodiments, the information includes a setting for one or more parameters for at least one of including in and controlling at least one of a router solicitation message, a router advertisement message, a neighbor solicitation message, a neighbor advertisement message and a redirect message.

In some embodiments, the profile contains at least one of (1) a setting for each of one or more parameters for neighbor discovery interface configuration and (2) a setting for each of one or more parameters for neighbor discovery address prefix configuration. Parameters for neighbor discovery interface configuration may include any one or more of a setting for a parameter enabling/disabling the transmission of information (for example the transmission of router advertisements); a setting for a parameter controlling the timing of transmission of information (for example a minimum and/or maximum router advertisement interval), a setting indicating a method to be used by the other network element for configuring an address thereof (for example whether or not the address is configured administratively), a setting indicating a method to be used by the other network element for configuring non-address information; a setting for a parameter indicative of the length of time the interface is reachable; a setting for a parameter indicative of the time between the transmission of consecutive information request messages (e.g. router or neighbor solicitations); a setting for a parameter indicative of the lifetime or a limitation of the network element; a setting for a parameter indicative of a hop limit for messages transmitted by the other network element; a setting for a parameter indicative of a number of duplicate address detection attempts and a setting for a parameter indicating a maximum packet length (e.g. maximum transmission unit). A profile for a prefix may include any one or more of a setting for a parameter associated with a prefix indicating if the prefix is on-link; a setting for a parameter associated with an address prefix indicative of a method for configuring an address; a setting for a parameter associated with an address prefix indicating the length of time an address created from the prefix remains valid; a setting for a parameter associated with an address prefix indicating the length of time an address created from the prefix remains preferred; a setting for a parameter associated with an address prefix indicative of a decrement of time an address created from the prefix is valid; a setting for a parameter associated with a prefix indicative of a decrement of the time and address created from the prefix remains preferred; and a setting for a parameter associated with a prefix indicative of the advertisement status of the prefix.

In some embodiments, the storage medium for storing one or more profiles is co-located with the network element. For example, the storage medium may comprise a memory or database in the network element. The storage medium may reside on a line card (or network termination card) or on a control card. In another embodiment, the storage medium may be located at another location in a communication network connected to the network element, for example at a node for controlling or managing a network, e.g. at a network management system (NMS).

The data storage medium may be a single device, or comprise a plurality of separate storage media, and different profiles may be stored in different storage media, and different storage media may be at the same or different locations.

In some embodiments, the network element comprises a plurality of communication interfaces, and wherein each interface is operable to access the profile by referring to the profile identifier. In this arrangement, since a number of interfaces can access the same profile, there is no need for the same information to be replicated and stored for each interface, thereby significantly saving storage space.

In some embodiments, the storage medium comprises a plurality of profiles, each having an identifier for identifying the profile, each profile comprising a setting for each of one or more parameters, and wherein each interface is operable to access a profile by referring to the respective identifier of a profile.

In some embodiments, the communication system further comprises a user interface operatively coupled to the storage medium for enabling a user to at least one of create and modify a profile.

According to another aspect of the present invention, there is provided a communication system comprising a network element having a plurality of communication interfaces, the system including a data storage medium storing a profile containing information for defining or configuring the interfaces, each interface being arranged to access the profile.

In some embodiments, each interface includes a reference to the profile which enables the profile to be accessed by each interface.

In some embodiments, each interface includes data defining the interface, the data including a reference to the profile.

According to another aspect of the present invention, there is provided a method of configuring a communication interface, comprising including in said interface a profile identifier for identifying a profile stored in a storage medium, said profile including one or more settings, each setting being for a respective parameter for said interface, and enabling said interface to access said profile by referring to said profile identifier.

In some embodiments, the method further comprises configuring one or more further communication interfaces, comprising, for each further interface, including in the interface, the profile identifier and enabling the interface to access the profile by referring to the profile identifier.

In some embodiments, the method further comprises configuring one or more further interfaces, comprising, for each interface, including in the interface, an identifier identifying a profile which contains one or more settings, each setting being for a respective parameter for the interface, and enabling the interface to access the profile by referring to the profile identifier.

In some embodiments, the profile identifier included in one or more interfaces comprises a first identifier for a first profile, and the profile identifier included in one or more other interfaces comprises a second identifier for a second profile, the first profile being different to the second profile.

In some embodiments, the first profile contains a first setting for a parameter, and the second profile contains a second, different setting for the same parameter.

In some embodiments, the method further comprises creating the profile and assigning an identifier to the profile.

According to another aspect of the present invention, there is provided a network element comprising a plurality of logical communication interfaces; a data storage medium storing a profile containing data defining each of said plurality of logical interfaces, said data including configuration data for transmission to and to configure another network element, said profile having a profile identifier for identifying said profile; and wherein each of said plurality of logical interfaces includes said profile identifier and accesses said profile and the data contained therein by referring to said profile identifier.

According to another aspect of the present invention, there is provided a method of reconfiguring a plurality of communication interfaces of a network element in a communication system, the communication system including an interface profile containing information at least partially defining each of said plurality of communication interfaces, said information including configuration information for transmission to and configuring another network element, said configuration information including a setting for a predetermined parameter, each communication interface being linked to the information in said interface profile, the method comprising the steps of: accessing said interface profile and modifying the setting of said predetermined parameter.

According to another aspect of the present invention, there is provided a machine readable medium comprising a data structure, said data structure including a profile having a setting for a settable parameter for a communication interface, and an identifier for enabling said profile to be distinguished from one or more other profiles which include a setting for said parameter.

In some embodiments, the data structure comprises a plurality of profiles, a profile having a setting for a parameter that is different to the setting for that parameter of another profile.

According to another aspect of the present invention, there is provided a machine readable medium comprising a data structure including data defining a communication interface, and a profile identifier identifying a profile that contains information for use by said communication interface, and for enabling said interface to access said information.

BRIEF DESCRIPTION OF THE DRAWINGS

Examples of embodiments of the present invention will now be described with reference to the drawings, in which:

FIG. 3 shows a profile containing information for an interface according to an embodiment of the present invention;

FIG. 4 shows an example of a prefix profile for a communication interface according to another embodiment of the present invention;

FIG. 5 shows an example of a communication interface according to an embodiment of the present invention.

DESCRIPTION OF EMBODIMENTS

Figure 1:
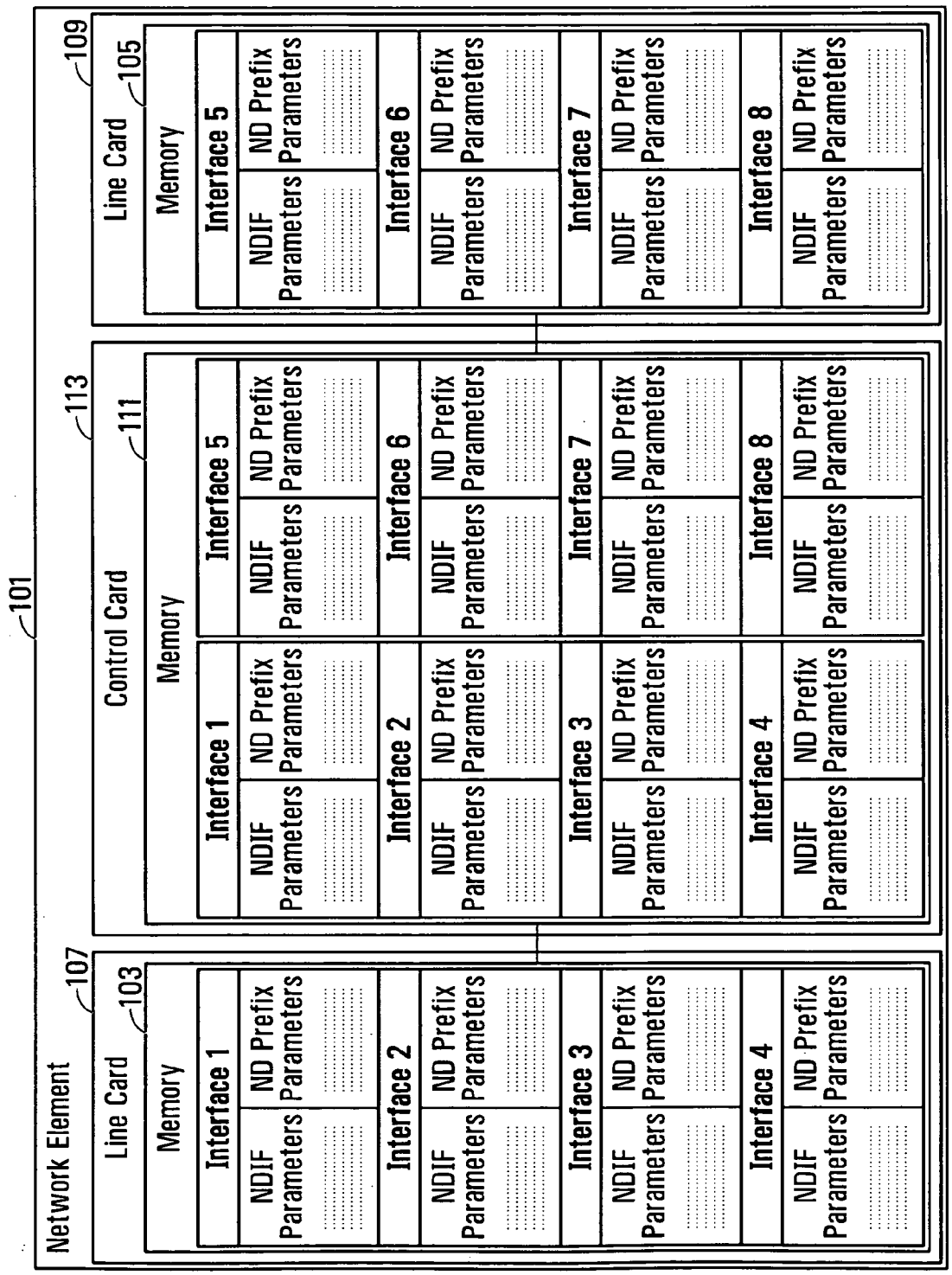
FIG. 1 shows a schematic diagram of a network element according to the prior art.
Figure 2:
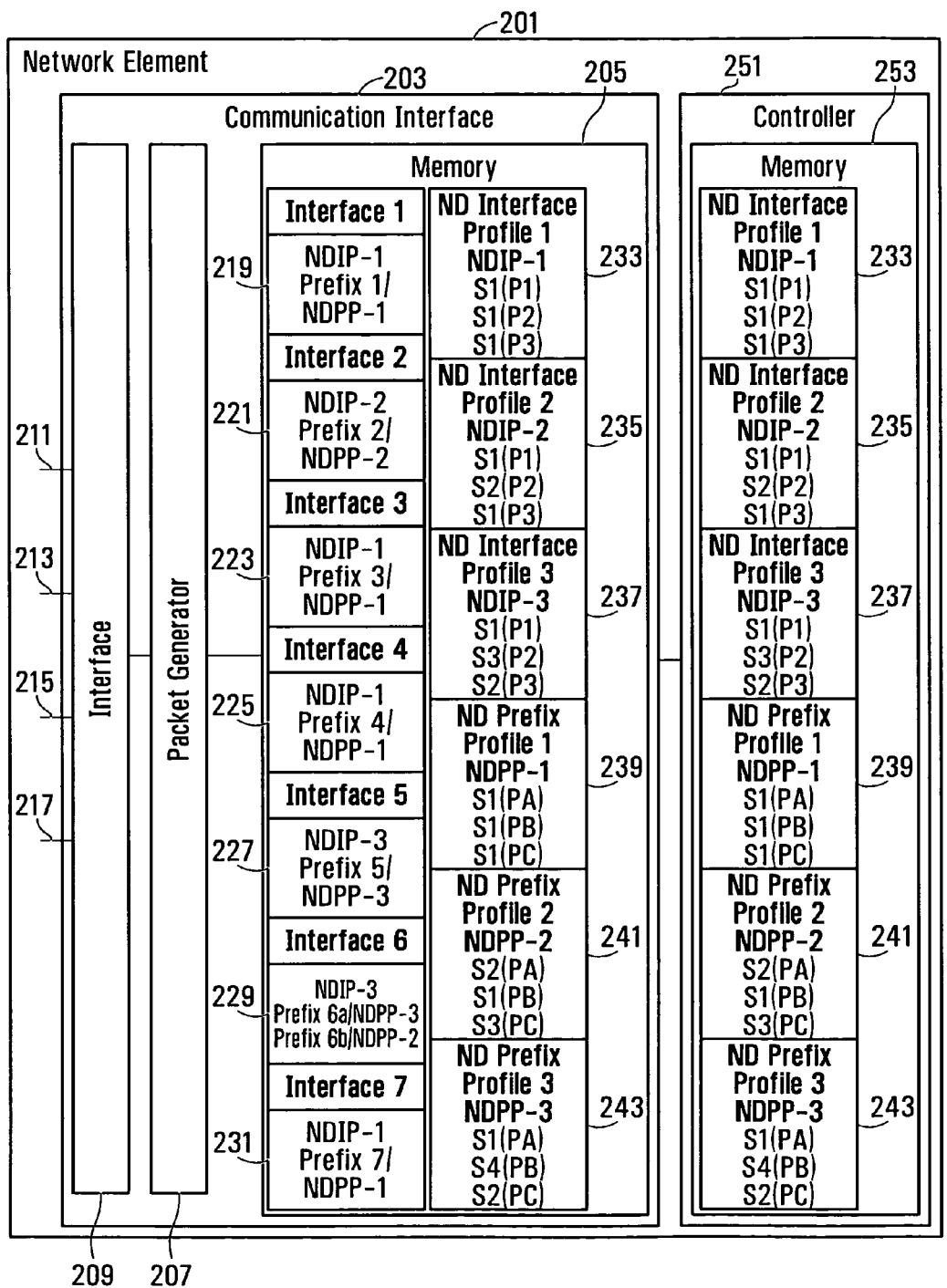
FIG. 2 shows a block diagram of a network element according to an embodiment of the present invention.

Referring to FIG. 2, a network element 201 according to an embodiment of the present invention, comprises a communication interface 203 having a memory 205, a packet generator 207, and a physical interface 209 having one or more communication ports 211, 213, 215, 217 for connection to a communication network (not shown). The memory 205 contains a plurality of sets of data 219, 221, 223, 225, 227, 229, 231, which each define a respective interface (interface 1, interface 2, interface 3, etc.). The memory also contains one or more profiles 233, 235, 237, 239, 241, 243, each containing information for an interface.

In this embodiment, information of one type is contained in a number of profiles 233, 235, 237 and information of another type is contained in a number of other profiles 239, 241, 243. In this particular example, profiles 233, 235 and 237 contain neighbor discovery (ND) interface settings, and profiles 239, 241 and 243 contain neighbor discovery address prefix information. In this example, each neighbor discovery interface profile includes a setting for each of a number of different parameters, and the setting for at least one parameter in one of the interface profiles is different to the setting for that parameter in at least one other interface profile. For example, the first interface profile 233 includes a setting S1(P1) for a first parameter (P1), a first setting S1(P2) for a second parameter, and a first setting S1(P3) for a third parameter. The second interface profile 235 contains the same setting for parameters P1 and P3, but a different setting, S2(P2), for the second parameter, P2. The third interface profile 237 contains the same setting, S1(P1) for the first parameter, P1, and different settings, S3(P2) and S2(P3), for the second and third parameters.

In this example, each prefix profile contains a setting for each of a plurality of different parameters and the setting for a parameter in one prefix profile is different from the setting for the same parameter in another prefix profile. In this particular example, the first prefix profile 239 contains a first setting, S1(PA), for a first parameter, PA, a first setting S1(PB), for a second parameter, PB, and a first setting, S1(PC) for a third parameter, PC. The second prefix profile 241 contains a different setting, S2(PA), for the first parameter, the same setting, S1(PB), for the second parameter and a different setting, S3(PC) for the third parameter. The third prefix profile 243 contains the same setting, S1(PA), for the first parameter as for the first prefix profile 235, and different settings, S4(PB) and S2(PC), for the second and third parameters.

It is to be noted that the above example of the settings for the interface and prefix profiles are for illustration only, and each interface profile and prefix profile may include settings for any number of parameters, and any setting for a parameter in one profile may be the same as or different to that contained in another profile.

As shown in FIG. 2, each profile includes an identifier which enables it to be distinguished from another profile. In this particular, example, the first, second and third neighbor discovery interface profile data structures include profile identifiers, NDIP-1, NDIP-2 and NDIP-3, respectively, and the first, second and third neighbor discovery prefix profiles include profile identifiers NDPP-1, NDPP-2 and NDPP-3, respectively. It is to be noted that these profile identifiers are merely examples, and any identifiers which enable one profile to be distinguished from another can be used.

Referring again to FIG. 2, each interface data set 219, 221, 223, 225, 227, 229, 231 generally includes an interface identifier (e.g. "interface 1", interface 2" etc.), one or more unicast addresses each having a prefix, a link local address, optionally one or more multicast addresses, and one or more other settings or parameter values defining the interface. Each interface also includes the identifier of one or more profiles whose settings are to be adopted by or incorporated in the interface. Generally, each interface data set includes the interface profile identifier of a selected interface profile, and the prefix profile identifier of a selected prefix profile for each global unicast prefix. In this particular, non-limiting example, the data set for the first, third, fourth and seventh interfaces 219, 223, 225, 231 includes the identifier for the first interface profile 233 and a respective global unicast prefix, Prefix 1, Prefix 3, Prefix 4, Prefix 7, each of which is assigned the identifier for the first prefix profile 239.

The data set for the second interface 221 includes the identifier for the second interface profile 235, and a global unicast prefix, "Prefix 2" to which is assigned the identifier for the second prefix 241.

The data set 227 for the fifth interface includes the profile identifier of the third interface profile 237 and a global unicast prefix, Prefix 5, to which the identifier for the third prefix profile is assigned.

The data set 229 for the sixth interface includes the identifier for the third interface profile 237, and two global unicast prefixes, Prefix 6a and 6b, to which the identifiers for the third and second prefix profiles 243, 241 are respectfully assigned.

The inclusion of one or more profile identifiers in an interface data set serves as a pointer to the particular profile to enable the information contained in the profile to be accessed when required to enable the interface to perform the required function. For example, for profiles relating to neighbor discovery, each profile may be accessed by referring to the profile identifier for the performance of neighbor discovery operations.

In the embodiment of FIG. 2, the network element 201 further comprises a controller 251 operatively coupled to the communication interface 203, for controlling and/or managing the communication interface 203, and which includes a memory 251. The memory 251 contains a copy of each profile 233, 235, 237, 239, 241, 243 that is stored in the memory 205 of the communication interface 203. The memory 253 may be a non-volatile memory and storage of each profile therein enables profiles to be transferred to the communication interface memory 205 when required, for example when a new interface is created or if the profiles stored in the interface memory 205 are lost, where, for example, the memory 205 is volatile and electrical power is removed.

The use of profiles can also considerably reduce the amount of storage space on the control card required for storing information relating to each interface.

In some embodiments, the communication interface 205 may store one or more profiles that are not stored in the controller memory 253 and/or vice versa.

In some embodiments, one or more profiles for one or more interfaces may be stored in the controller memory 253, rather than in the interface memory 205, and/or another memory either co-located with the network element or in another location, for example at another node in the network. One or more profiles need not be stored in the same memory as the interface data set(s), and can be stored in a different memory, which may reside at the communication interface or elsewhere. Locating the profile(s) close to the interface(s) may assist in reducing time to access and/or retrieve information from a profile for efficiency and speed of operation.

The operation of each interface is controlled according to the parameters stored in its associated data set. When the process control requires information from a profile, access to the information is enabled by reference to the profile identifier(s) associated with the interface data set. For example, if a message (e.g. a neighbor discovery Router Advertisement) is to be transmitted by the interface, the control process accesses the relevant profile(s) by reference to the profile identifier(s), retrieves the setting(s), and an appropriate packet or packets is/are generated by the packet generator 207, the packets including any required setting(s) or information from the profile, and the packet(s) transmitted from the appropriate port(s) of the interface 209.

Information contained in a profile may include, for example, information which configures or conditions the interface to operate in a particular way and/or information which the interface is to transmit to one or more other network entities when communicating therewith. The information to be transmitted may contain information for configuring a network element, such as a setting for each of one or more parameters which indicate how the network element is to behave or perform an operation, e.g. communications relating to neighbor discovery. For example, the information contained in a profile may include information for controlling and/or to be included in neighbor and/or router solicitation message(s) and/or neighbor and/or advertisement message(s) and/or redirect message(s). Examples of these neighbor discovery messages for IPv6 are described in RFC2461 Neighbor Discovery for IPv6 published at http://www.ietf.org/rfc/rfc2461.txt and the references listed therein, which includes "IPv6 Stateless Address Auto Configuration", published at http://www.ietf.org/rfc/rfc2462.txt, and the entire content of these documents and references are incorporated herein by reference in their entirety.

In IPv6, a router solicitation is a message transmitted by network elements, e.g. hosts that request routers to generate router advertisements immediately rather than at their next scheduled time.

In IPv6, router advertisements are messages generated by routers which advertise their presence together with various link and internet parameters either periodically, or in response to a router solicitation message. Router advertisements may contain prefixes that are used for on-link termination and/or address configuration, and may include other parameters such as a suggest hop limit value.

In IP, a prefix is a bit string that comprises some number of initial bits of an address. Nodes use prefixes to distinguish destinations that reside on-link from those only reachable through a router.

In IPv6, neighbor solicitation messages are messages sent by a node to determine the link-layer address of a neighbor, or to verify that a neighbor is still reachable via a cached link-layer address. Neighbor solicitations may also be used for Duplicate Address Detection.

In IPv6, a neighbor advertisement message is a response to a neighbor solicitation message. A node may also send unsolicited neighbor advertisements to announce a link-layer address change.

In IPv6, a redirect message is a message that is used by routers to inform hosts of a better first hop for a destination.

It is to be noted that the above described messages for IPv6 are merely examples of various messages in which information from a profile may be included, and is no way limiting of the invention. For example, information in a profile may be transmitted to another network element in any other form of message, as required. Furthermore, although in some embodiments, one or more profiles may include information relating to neighbor discovery, in other embodiments, the information may relate to any other aspect(s) of the interface and its operation, and configuration or control information contained in a profile for transmission to another network element may relate to any other aspect of that network element's operation.

In one embodiment, an interface profile may include information relating to router advertisement (RA) messages. This information may include a setting for each of one or more parameters or configuration items, for example, any one or more parameters from the following list:
Router Advertisement (RA) enable/disable;
Minimum RA Interval;
Maximum RA Interval;
Advertised Managed Address Configuration Flag;
Advertised Other Stateful Configuration Flag
Advertised Reachable Time;
Advertised Retransmit Time;
Advertised Hop Limit;
Advertised (Default) Router Lifetime; and
Maximum DAD (Duplicate Address Detection) Attempts, etc.

The "router advertisement" parameter indicates whether the interface is enabled to or disabled from sending router advertisements. The "minimum" and "maximum RA interval" parameters specify the minimum and maximum period of time between successive router advertisement messages. The "advertised" parameters are parameters which are transmitted to and used by another network element in performing neighbor discovery communications. In particular, the "managed address configuration flag" indicates whether or not the network element is to use an administered protocol for address auto configuration. For example, a network element may configure its own address from a prefix advertised by one or more routers that identifies a subnet associated with a link to which the interface is connected and a self generated "interface identifier" that uniquely identifies the interface on the subnet, or the "interface identifier" may be provided for the interface by an administrator.

The "other stateful configuration flag" indicates whether the network element should use the administered protocol for auto configuration of other (non-address) information. The "reachable time" parameter indicates the time that a network element assumes a neighbor is reachable after having received a reachability confirmation. The "retransmit time" parameter is the time between retransmitted neighbor solicitation messages. The "hop limit" parameter indicates the number of hops a network element should include in outgoing messages. The "default" or "router lifetime" parameter indicates the length of time a router is a default router. The "duplicate address detection attempts" parameter indicates the number of times a network element can determine if another network element has the same address during address configuration. Typically, before a link-local address can be assigned to an interface and used, a node is required to attempt to verify that this "tentative" address is not already in use by another node. Detection is performed by the node sending a neighbor solicitation message containing the tentative address as the target. If another node is already using that address, it will return a neighbor advertisement confirming that this is the case.

Each of these parameters is defined in RFC 2461, Neighbor Discovery for IPv6, the entire content of which is incorporated herein by reference. In other embodiments, a profile may contain one or more settings that relate to a different standard to IPv6, (for example a later version of IP) and the setting(s) may have a similar meaning or function to those in IPv6, or a different meaning and/or function.

FIG. 3 shows a non-limiting example of an interface profile. Referring to FIG. 3, the interface profile 301 includes an interface profile identifier 303, which in this example is "NDIP-1" (corresponding to the first interface profile of FIG. 2). The profile 301 includes settings or values for a number of configuration items or parameters, including: "send router advertisements", "minimum router advertisement interval", "maximum router advertisement interval", "advertised managed flag", "advertised other configuration flag", "advertised reachable time", "advertised retransmit time", "advertised hop limit", "advertised default lifetime", and "advertised maximum DAD (Duplicate Address Detection) attempts".

One or more profiles may include information relating to prefix configurations, for example, a setting for each of one or more prefix parameters. The parameters for a prefix profile may include any one or more parameters from the following list:
On-Link Flag;
Autonomous Address Configuration Flag;
Valid Lifetime; and
Preferred Lifetime, etc.

The "on-link flag" indicates that the prefix can be used for on-link determination. The "autonomous address configuration flag" indicates that this prefix can be used for autonomous address configuration, i.e. whether or not the prefix can be used by the network element to configure its own address or requires the address to be configured administratively. The "valid lifetime" parameter indicates the length of time that an address configured with the prefix is valid, and the "preferred lifetime" parameter indicates a length of time that an address created from the prefix remains preferred. Other prefix parameters may include "valid lifetime decrement" and "preferred lifetime decrement" flags which allow the valid and preferred lifetimes to be decrement. Another prefix parameter is an "advertisement of prefix flag" which indicates whether or not the address prefix is to be advertised.

Each of these parameters is defined in RFC 2461, Neighbor Discovery for IPv6. In other embodiments, a prefix profile may contain one or more settings that relate to a different standard to IPv6, (for example a later version of IP) and the setting(s) may have a similar meaning or function to those in IPv6, or a different meaning and/or function.

A specific, non-limiting example of a prefix profile is shown in FIG. 4. Referring to FIG. 4, the prefix profile 401 includes a profile identifier 403, which in this example is "NDPP-1" (corresponding to the first prefix profile of FIG. 2). The profile includes values or settings for the configuration items or parameters: "on-link flag", "autonomous flag", "valid lifetime", "preferred lifetime", "valid lifetime decrement flag", "preferred lifetime decrement flag", and "advertisement of prefix flag".

FIG. 5 shows an example of an interface definition or representation which includes the profiles shown in FIGS. 3 and 4. Referring to FIG. 5, the interface definition 501 includes an interface identifier 503, a link local address, global addresses and multi-cast addresses for the interface, settings for other parameters, which in this example include "alarms", "MTU", "IP traffic profile", "ingress DSCP marking", "allow extension HDRs", "COS classification", "admin status", "ICMPV6 unreachables", "encapsulation", "bandwidth" and "egress DSCP marking". Each of these parameters is described in more detail below. In addition, the interface definition 501 includes a reference to the interface profile "NDIP-1", and the "global address" prefix 3FFE:501:FFFF: 1::/64, that refers to the prefix profile "NDPP-1".

Other embodiments of an interface may include any one or more of the configuration items identified above, and/or any other configuration items.

"Alarms" is a setting to enable/disable raising of alarms when the operational status of the interface changes.

"IP Traffic Field" is a pointer to a field that describes the traffic bandwidth characteristics on the interface (for customer facing interfaces, this defines the service level agreement(SLA) for example).

"Ingress DSCP Marking" is a setting to turn on/off the re-writing of the IP DiffServ CodePoint (DSCP) for packets received on the interface. DSCP is often used in an IP network to identify the Quality of Service (QoS) required for the packet. DSCP might be updated/marked either if a)the router makes a better judgement of what the QoS needs to be than is trusted by the user setting in the packet, or b) if the Drop Precedence (DP) represented in the DSCP changes due to exceeding the SLA (Service Level Agreement).

"Allow Extension Headers" is a setting to Enable/disable the router from processing IPv6 extension headers.

"CoS Classification" is a setting to instruct the router how to determine the QoS requirements for packets received. This parameter could be set to any of a number of settings including, for example: a) DSCP lookup (profile specified), b) multi-field classification, or c) hardcoded to a particular QoS.

"Admin Status" is a setting to administratively enable or disable the interface.

"ICMPv6 Unreachables" is a setting to enable or disable the sending of ICMPv6 (Internet Control Message Protocol Version 6) unreachables on the interface. One example of when these are sent would be if a packet was trying to be transmitted from the interface, but the neighbor was not reachable.

"Egress DSCP marking" is a setting which is similar to ingress DSCP marking, but for outgoing packets from the interface. As illustrated in FIGS. 3 and 4, the configuration information required by each interface for neighbor discovery can include settings for relatively large numbers of parameters, and in this example, the interface profile includes ten parameters and the prefix profile includes seven parameters. Conventionally, when creating a new interface, all of these parameters would be individually listed in each interface definition.

Therefore, ignoring separate control and line card storage, the memory space required to store the interface definition as configuration files is on the order of the number of interfaces times the number of parameters. For 100,000 interfaces, and 17 neighbor discovery parameters, the amount of memory space would be 100,000×17.

In contrast, with the use of profile(s), the amount of memory space required is of the order of the number of profiles times the number of parameters in a profile plus the numbers of interfaces. In the same example, and assuming 32 profiles, the space required would be 32×17+100,000, which is significantly less.

Furthermore, conventionally, when settings for a group of interfaces is to be changed, it is necessary for an operator to enter the new settings individually for each interface. Where changes in settings are required for large numbers of interfaces, for example, thousands or tens of thousands of interfaces per router, this procedure is both time consuming and laborious. In contrast, the use of profiles containing configuration information to which interfaces can refer allows the work involved in changing settings for large numbers of interfaces to be considerably reduced. For example, changes in the settings affecting one or more interfaces may be implemented by changing one or more profile identifiers in each interface definition to one or more other profiles, for example, profiles that were either previously created or are newly created, or simply by changing one or more settings within a profile to which the interfaces already refer, in which case all of the interfaces can be automatically modified with the new setting(s) simply by modifying the settings within the relevant profile(s). For instance, referring to the above example shown in FIGS. 3 to 5, if 10,000 interfaces refer to interface profile "NDIP-1", shown in FIG. 3, and one or more parameters, for example, the minimum and maximum router advertisement intervals are to be changed for those 10,000 interfaces, it is only necessary to make two changes within the profile, as opposed to 20,000 changes which would be required for changing each interface definition individually.

Any network node may include any number of interface profiles. The profiles may include any number of profiles for customer facing interfaces, and any number of profiles for core router facing interfaces, for example. One or more "default" profiles may be created in which the parameters have the most probable settings. When an interface is first created, the interface may refer to a default profile. However, if one or more default settings do not match the operator's requirements, the settings can be changed simply by selecting a different profile and changing the reference in the interface definition to that profile. Alternatively, the required setting(s) in the profile can be changed to the required value(s), causing all interfaces to be updated at the same time in one operation. For example, for bulk interface (e.g. IPv6 interface) provisioning, each interface may refer to one or more default profile(s) and no further configurations need be required. If a change to a customer facing interface (or other interface) behavior is required at a later time, the system profile for customer facing interfaces (or other interfaces) is modified, and all interfaces referring to the profile are updated.

The use of profiles containing interface configuration information can be applied to any number of nodes in a communication network. For example, one or more profiles can be deployed from a single source to any number of network nodes, which may facilitate the provisioning of and making modifications to interface configurations, and an example is shown in FIG. 6.

Figure 6:
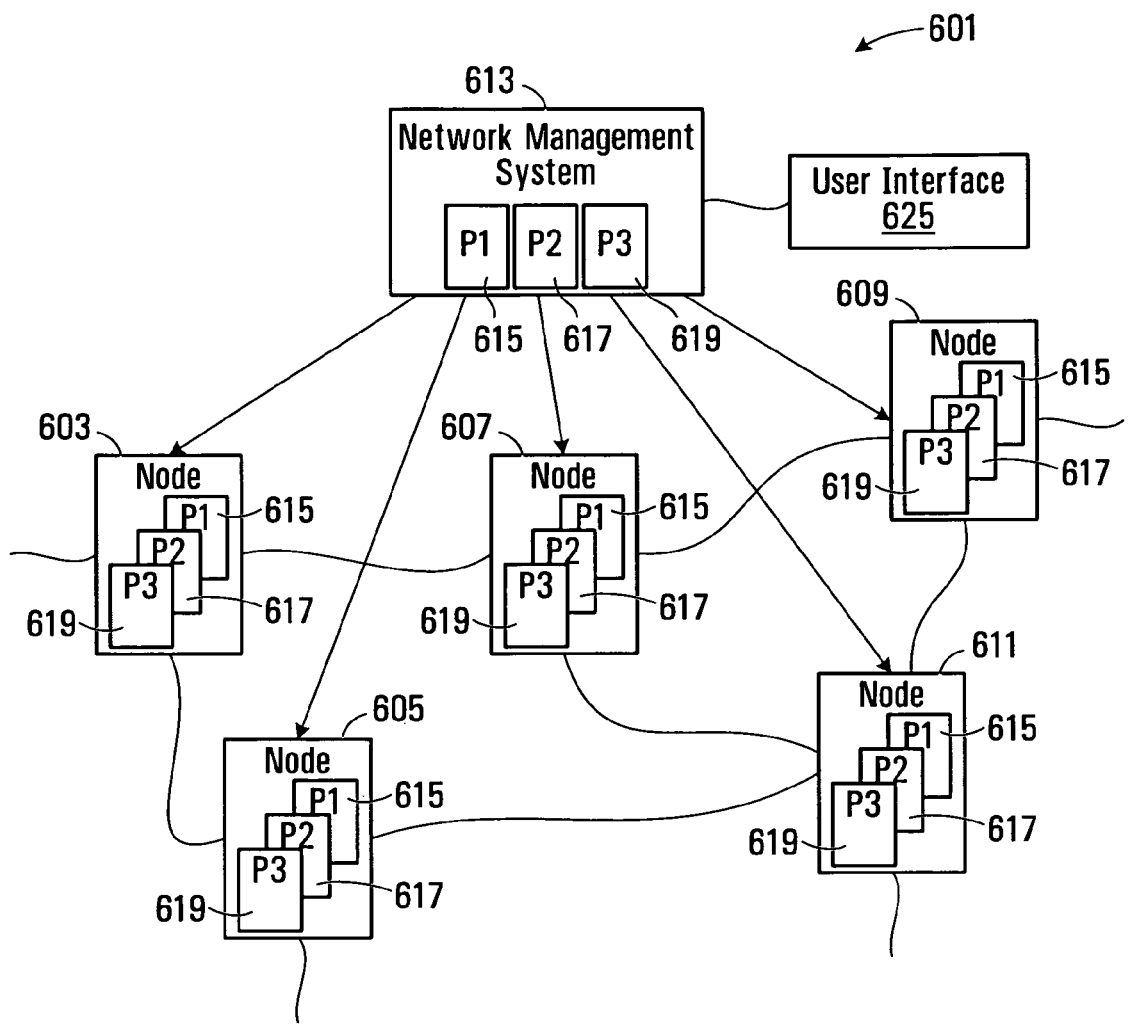
FIG. 6 shows a schematic diagram of a communication network, according to an embodiment of the invention.

Referring to FIG. 6, a communication network 601 comprises a number of network elements 603, 605, 607, 609, 611 and a network management system (NMS) 613, and the NMS may, for example, comprise a server or group of servers. One or more profiles 615, 617, 619, each containing configuration information for an interface can be transmitted from the network management system 613 to each network element to which the profile is applicable. In the example of FIG. 6, each of three profiles 615, 617, 619 is transmitted to each network element 603, 605, 607, 609, 611. However, it is to be noted that generally, any one profile may be transmitted to any one or more network elements, and the profile(s) transmitted to any one or more network elements may be different to the profile(s) transmitted to any one or more other network elements.

In this embodiment, a user interface 625 is connected to the network management system to enable an operator to create a profile(s), revise/edit a profile(s), and create and configure interfaces on network elements, including assigning profile identifier(s). In other embodiments, a user interface may be locally connected to a network element to enable an operator to create, configure or edit interfaces and/or profiles for the network element.

In other embodiments of the invention, any profile may include any one or more settings or values for use by an interface, whether for neighbor discovery, or for any other purpose.

Other aspects and embodiments of the present invention comprise any one or more features disclosed herein in combination with any one or more other features disclosed herein, their equivalent, or a variant thereof. In any of the embodiments disclosed herein, any one or more features may be omitted altogether, or substituted by any one or more other features disclosed herein, or by a variant or equivalent thereof.

Numerous modifications and changes to the embodiments described above will be apparent to those skilled in the art.

The invention claimed is:

1. A method of reconfiguring, for performing neighbor discovery, a network element in a communication system, the network element comprising a plurality of communication interfaces, each communication interface being defined by a plurality of parameters, said network element including a network termination card comprising first data storage storing together a discrete set of parameters, the parameters in said discrete set consisting only of parameters in which each parameter of the set is common to and contributes to the definition of each interface of a group of said plurality of interfaces, said discrete set of parameters including parameters for transmission from said network element to and for configuring and controlling another network element in performing neighbor discovery, said discrete set having a set identifier for identifying said discrete set of parameters, whereby each of said parameters of the discrete set is associated with said set identifier, each of the communication interfaces of the group comprising a respective interface data storage on said network termination card storing a respective data set defining each communication interface of the group, each interface data storage being separate from said first data storage such that said discrete set of parameters is stored separately from each data set, wherein each data set includes the identifier of the discrete set of parameters, the identifier serving as a substitute in each data set for the parameters in said discrete set of parameters, wherein each communication interface of the group is configured to access said parameters in said discrete set by referring to said identifier, and to generate and transmit to another network element a message containing one or more parameters in said discrete set of parameters, the method comprising accessing the set of parameters and modifying a setting of one or more parameters in the set, thereby reconfiguring each interface of said group of interfaces to perform neighbor discovery in accordance with the modified set of parameters.

2. A method of reconfiguring, for performing neighbor discovery, a network element in a communication system, the network element comprising a plurality of communication interfaces, each communication interface being defined by a plurality of parameters, said network element including a network termination card comprising first data storage storing together a first discrete subset of parameters, the parameters in said first discrete subset consisting only of parameters in which each parameter of the first discrete subset is common to and partially defines each interface of a first group of said plurality of interfaces, said first discrete subset of parameters including parameters for transmission from said network element to and for configuring and controlling another network element in performing neighbor discovery, said first discrete subset having a first subset identifier for identifying said first discrete subset of parameters whereby each of said parameters of said first discrete subset is associated with said first subset identifier, second data storage storing together a second discrete subset of parameters, the parameters in said second discrete subset consisting only of parameters in which each parameter of the second discrete subset is common to and partially defines each interface of a second group of said plurality of interfaces, one or more parameters of said second discrete subset of parameters being for use in neighbor discovery, said second discrete subset having a second subset identifier for identifying said second discrete subset of parameters whereby each of said parameters of the second discrete subset is associated with said second subset identifier, each of the communication interfaces of the first and second groups comprising a respective interface data storage on said network termination card storing a respective data set defining each communication interface of said first and second groups, each interface data storage being separate from said first data storage and said second data storage such that said first and second discrete subsets of parameters are stored separately from each data set, wherein each data set of the interfaces of said first group includes the identifier of the first discrete subset of parameters, the first subset identifier serving as a substitute in each data set of said first group of interfaces for the parameters in said first discrete subset, and wherein each communication interface of the first group is configured to access said parameters in said first discrete subset by referring to said first subset identifier, and to generate and transmit to another network element a message containing one or more parameters in said first discrete subset, and wherein each data set of said second group of interfaces includes said second identifier of the second discrete subset of parameters, the second identifier serving as a substitute in each data set of said second group of interfaces for the parameters in said second discrete subset, and wherein each communication interface of the second group is configured to access said parameters in said second discrete subset by referring to said subset identifier for use in neighbor discovery, wherein one or more data sets of said first group of interfaces includes said second discrete subset identifier, serving as a substitute in said one or more data sets for the parameters in said second discrete subset, the method comprising accessing at least one of said first and second discrete subsets of parameters, and modifying a setting of one or more parameters of the accessed subset and thereby reconfiguring for neighbor discovery each interface containing the identifier of the modified subset.

3. The method as claimed in claim 2, wherein one or more parameters in the second discrete subset provides neighbor discovery address prefix information.

4. The method as claimed in claim 2, wherein said first data storage and each interface data storage of at least one of said first and second groups of interfaces are located on the same memory device.

5. The method as claimed in claim 2, wherein the second data storage and each interface data storage of at least one of the first and second group of interfaces are located on the same memory device.

6. The method as claimed in claim 2, wherein the first data storage is located on a first memory device, and each interface data storage of at least one of said first and second groups of interfaces is located on a second memory device, separate from said first memory device.

7. The method as claimed in claim 2, wherein said second data storage is located on a first memory device, and each interface data storage of at least one of said first and second groups of interfaces is located on a second memory device, separate from said first memory device.

8. A method of reconfiguring, for performing neighbor discovery, a network element in a communication system, the network element comprising a plurality of communication interfaces, each communication interface being defined by a plurality of parameters, said network element including a network termination card comprising first data storage storing together a first discrete set of parameters, the parameters in said first discrete set consisting only of parameters in which each parameter of the first set is common to and contributes to the definition of each interface of a group of said plurality of interfaces, said first discrete set of parameters including parameters for transmission from said network element to and for configuring and controlling another network element in performing neighbor discovery, said first discrete set having a first set identifier for identifying said first discrete set of parameters, whereby each of said parameters of the first discrete set is associated with said first set identifier, each of the communication interfaces of the group comprising a respective interface data storage on said network termination card storing a respective data set defining each communication interface of the group, each interface data storage being separate from said first data storage such that said first discrete set of parameters is stored separately from each data set, wherein each data set includes the first identifier of said first discrete set of parameters, the first identifier serving as a substitute in each data set for the parameters in said first discrete set, and wherein each communication interface of the group is configured to access said parameters in said first discrete set by referring to said first set identifier, and to generate and transmit to another network element a message containing one or more parameters in said first discrete set, the network termination card further comprising second data storage storing together a second discrete set of parameters, the parameters in said second discrete set including parameters for transmission from said network element to and for configuring and controlling another network element in performing neighbor discovery, said second discrete set having a second set identifier for identifying said second discrete set of parameters whereby each of said parameters of said second discrete set is associated with said second subset identifier, said second data storage being separate from said first data storage and each interface data storage such that said second discrete set of parameters is stored separately from said first data storage and each data set, the method comprising accessing one or more data sets of said group of interfaces, and replacing said first set identifier in said one or more accessed data sets with said second identifier which thereby serves as a substitute in each accessed data set for the parameters in said second discrete subset whereby each communication interface whose first set identifier is replaced with said second set identifier is reconfigured to access said parameters in said second discrete set instead of said parameters in said first discrete set, by referring to said second set identifier, and to generate and transmit to another network element a message containing one or more parameters in said second discrete set.

9. The method as claimed in claim 8, wherein the parameters in said second discrete set consist only of parameters in which each parameter of the second set is common to and contributes to the definition of each interface of a second group of said plurality of interfaces.

10. The method as claimed in claim 8, wherein said first data storage and each interface data storage are located on the same memory device.

11. The method as claimed in claim 8, wherein said first data storage is located on a first memory device, and each interface data storage is located on a second memory device separate from said first memory device.

12. The method as claimed in claim 8, wherein said second data storage and each interface data storage are located on the same memory device.

13. The method as claimed in claim 8, wherein said second data storage is located on a first memory device, and each interface data storage is located on a second memory device, separate from said first memory device.

* * * * *